Figure 1:
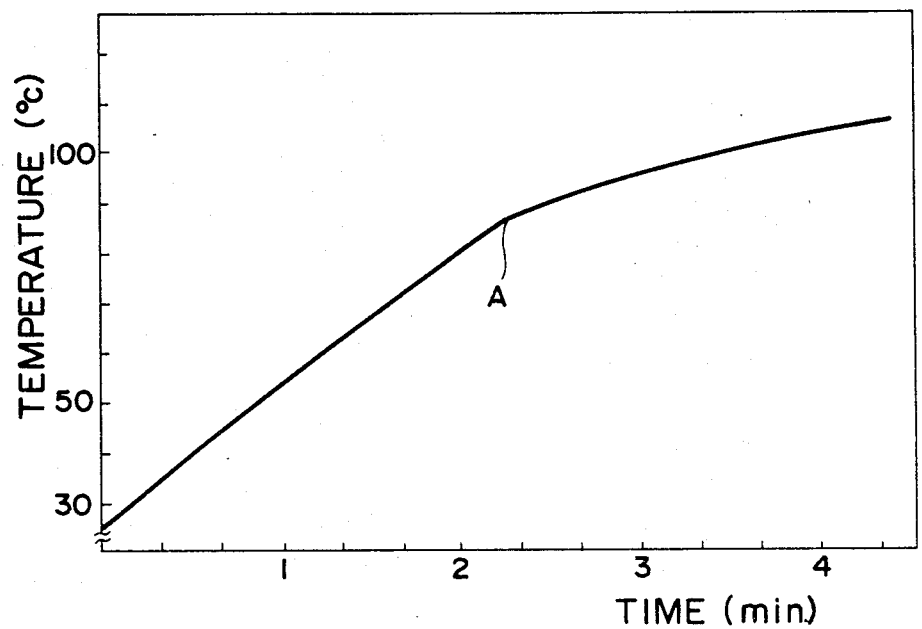

United States Patent [19]

Sugisawa et al.

[11] Patent Number: 4,537,789
[45] Date of Patent: Aug. 27, 1985

[54] PROCESS FOR PREPARING RETORT TOFU

[75] Inventors: Ko Sugisawa; Yasushi Matsumura; Kazumitsu Taga; Kouji Sengoku; Yoshiaki Nagatome, all of Higashiosaka, Japan

[73] Assignee: House Food Industrial Company Ltd, Osaka, Japan

[21] Appl. No.: 554,863

[22] Filed: Nov. 23, 1983

[30] Foreign Application Priority Data

Oct. 20, 1983 [JP] Japan .................. 58-196806

[51] Int. Cl.$^3$ .......................... A23J 3/00; A23L 1/20
[52] U.S. Cl. .................................... 426/634; 426/407; 426/582; 426/656
[58] Field of Search ............... 426/656, 399, 401, 407, 426/408, 412, 520, 521, 573, 325, 322, 634, 582

[56] References Cited

U.S. PATENT DOCUMENTS 4,000,326 12/1976 Okada et al. ................... 426/407
4,140,811 2/1979 Ogasa et al. ................... 426/521

FOREIGN PATENT DOCUMENTS 0006224 3/1978 Japan ................... 426/407
56-50940 5/1981 Japan .
0050941 12/1981 Japan ................... 426/634

Primary Examiner—Robert Yoncoskie
Assistant Examiner—Marianne S. Minnick
Attorney, Agent, or Firm—Harry M. Weiss; William W. Holloway

[57] ABSTRACT

An improved process for preparing retort tofu, wherein the rate of rise in temperature, at the center of a raw material for retort tofu, is adjusted within a desired range during the term from the initiation of the retort treatment to an inflection point. The pressure in the retort apparatus is controlled at the latest at the inflection point whereby retort tofu, having smooth and compact texture and being free from pores and syneresis, is obtained.

9 Claims, 1 Drawing Figure

PROCESS FOR PREPARING RETORT TOFU

BACKGROUND OF THE INVENTION

The present invention relates to a process for preparing a "retort tofu" which is storable for a long period of time. More particularly, the present invention relates to a new process for preparing a retort tofu having excellent taste and texture, in which the formation of pores and syneresis do not occur, by simply adjusting specific conditions of the retort procedures.

Heretofore, it has been known that a so-called packaged tofu can be prepared by adding a suitable amount of a coagulant to soybean milk, charging the mixture into a container, sealing the container and heating it to coagulate the mixture. However, if the packaged tofu is subjected to a retort treatment in which the tofu is maintained at a high temperature of at least 100° C. and a high pressure, in order to impart long-term storability to the packaged tofu, the formation of pores and the occurrence of the syneresis become quite a significant problem and further, the tofu lacks smoothness and compactness, qualities which are regarded as the life and the soul of good tofu. Therefore, the resulting tofu according to such process is inferior in quality.

For improving such process for coagulating tofu by the retort treatment, it has been proposed to use a product obtained by adjusting the pH of soybean milk and then maintaining it at a temperature of at least 115° C. for a suitable period of time (see Japanese Patent Publn. No. 50941/1981) and to disperse a curd, prepared by coagulating soybean milk with an acid and/or a salt and removing the supernatant, into water, and adding egg white to the dispersion and then mixing to form a uniform dispersion, thereafter charging the dispersion into a container and heating it under high temperature and pressure conditions (see Japanese Patent Publn. No. 50940/1981) or the like.

However, all of the foregoing processes are very complicated since they require a lot of steps compared to the conventional process for the preparation of tofu. In addition, in the latter process egg white is used, which is not usually used as an ingredient of tofu and therefore, the resulting tofu cannot be regarded as a pure tofu.

SUMMARY OF THE INVENTION

Under such circumstances, the inventors focused their attention on different factors than those emphasized in the conventional methods, ie., they paid special attention to the various external factors which directly relate to the coagulation of soybean milk during the retort procedure and conducted exhaustive studies toward the development of a new method for preparing retort tofu having improved properties without making the process complicated or using other additives such as egg white. As a reult, the inventors found that the coagulation process of soybean milk during retort treatment is roughly separated into two different steps, which differ in their curvature, crossing at an inflection point A (see attached FIG. 1) and that the term from the starting point of retort treatment to the inflection point A (first step) is the coagulation process mainly characterized by convectional heat transfer and the term of from the inflection point A to the end of the retort treatment (second step) is that mainly characterized by conductive heat transfer. They further learned that the tofu-quality determining factors are the rate of rise in temperature at the center of the raw material for retort tofu in the first step and the pressure of the atmosphere surrounding the material in the second step and that, therefore, the adjustment of these factors is quite effective to obtain an improved retort tofu.

The principal purpose of this invention is to provide an improved simple process for preparing retort tofu without using any additives.

Another purpose of this invention is to provide retort tofu which is improved in taste and texture and which is free from pores and free from the occurrence of syneresis.

These and other objects of this invention may be accomplished by adjusting the rate of rise in temperature at the center of raw material for retort tofu during the first step and suitably adjusting the pressure of atmosphere surrounding the material during the second step.

DETAILED EXPLANATION OF THE INVENTION

The process according to the present invention comprises charging a mixture of soybean milk or an aqueous solution of separated soybean protein and a coagulant into a heat-resistant container, sealing the container and then subjecting it to retort treatment in a retort apparatus, characterized by adjusting the rate of rise in temperature at the center of the mixture to 0.05° to 1.00° C./sec in the term from the beginning of the retort treatment to the inflection point A and by introducing air into the retort apparatus to make the pressure in the apparatus higher than that in the heat-resistant container.

According to the present invention, the occurrence of syneresis is restricted and a smooth and compact texture is imparted to the final tofu by maintaining the rate of rise in the material temperature within a desired range during the first step, while the formation of pores and the occurrence of syneresis are significantly suppressed by adjusting the pressure condition during the second step and therefore, it is possible to provide a retort tofu which is free from pores and syneresis and has an excellent texture.

Through their study, the inventors found that among the factor affecting the formation of pores and the occurrence of syneresis the most important is the pressure of the atmosphere surrounding material to be treated during the second step. Therefore, it is quite important to control the pressure of the atmosphere to improve the quality of the final product tofu. On the other hand, the adjustment of the rate of rise in the temperature of the material at its center during the first step is very important to impart smooth and compact texture to the final tofu and to suppress the occurrence of syneresis.

The invention will be well understood by referring to the following detailed description.

FIG. 1 is a curve which shows the relationship between time and the temperature of tofu at its center, the capital letter A representing an inflection point.

In the process of this invention, soybean milk or an aqueous solution of separated (or isolated) soybean protein is used as a starting material. The soybean milk may be prepared by a conventional process which comprises, for example, using whole soybean, skin-removed soybean or defatted soybean as a starting material and treating it according to the following series of processes: (starting material)→immersion in water→addition of water→grinding (to form "Go")→heating-→separation of lees of tofu→(soybean milk). Optionally, the heating process may be omitted and the "Go" (which is a mushy ground product of the fresh soybean swollen with water) is directly subjected to the separation process to form soybean milk. However, it is desirable to apply a heat treatment to the "Go", such as boiling, for about 30 seconds to 10 minutes at a temperature of about 80° to 100° C.

Such heating process is quite desirable for the reasons that the heat treatment causes a moderate modification of soybean protein whereby the water retention of the final tofu can be enhanced and the tofu becomes agreeable to the palate.

It is possible in the process of this invention to use so-called powdered soybean milk obtained by powdering or granulating the soybean milk prepared according to the process hereinbefore described, by the use of a spray-drying method or the like. In this case, the powdered soybean milk is preferably used in a form of a dispersion or solution prepared by dispersing and dissolving it into water or hot water.

The aqueous solution of the separated soybean protein as used herein can be obtained by adding a precipitant to the soybean milk prepared by a conventional method to precipitate soybean protein and redispersing and redissoving the precipitate into water.

The solids concentration in the soybean milk or the aqueous solution of the separated soybean protein used in the process of this invention is not critical and can be adjusted by controlling the amount of water adder at each process step in preparing the same depending on the amount and the kind of the coagulant used. However, as an example, if the solids concentration is in the range of from 5 to 18% by weight of the total soybean milk, preferably 8 to 15%, it is possible to obtain retort tofu having a more proper degree of hardness and uniform taste and texture.

As the coagulant, there may be mentioned, for example any of the well known coagulants, for tofu such as δ-gluconic lactones (hereunder referred to as G.D.L.) and divalent metal salts such as calcium sulfate. These coagulants may be used singly or in combination.

The coagulant is used according to a conventional method. For example, it may be used by directly mixing with soybean or it may also be used in the form of a previously formed aqueous solution.

The amount of the coagulant to be added depends on the desired degree of hardness of the final tofu; the amount of the soybean milk used and the like and it is usually sufficient to use G.D.L. in an amount of 0.1 to 0.4%, preferably 0.13 to 0.25% by weight of the soybean milk in order to obtain retort tofu having a proper hardness and uniform taste and texture. While calcium sulfate is usually used in an amount of 0.15 to 0.50%, preferably 0.25 to 0.35% by weight of soybean, whereby the same effect can be attained.

The soybean or the aqueous solution of the separated soybean protein and the coagulant as used herein may be mixed and charged into a container by, for instance, previously mixing them in a tank or by using a mixer, and then introducing the mixture into a container, or by mixing them after simultaneously or separately introducing them into a container from separate sources.

It is desirable in the process of the invention to suppress the coagulation prior to the initiation of the retort treatment as much as possible in order to make the texture of the finished tofu more uniform. This may be accomplished by adjusting the temperature of the soybean milk to within the range of 5° to 30° C. during the mixture with the coagulant.

In particular, if the soybean is mixed with a coagulant prior to introducing it into a container and if a coagulant having an immediate effect such as calcium sulfate is used, it is desirable to control the coagulation by precooling the soybean milk to a temperature of from 5° to 20° C. or by adding a coagulation-retarding agent, for example a polyphosphate such as sodium pyrophosphate or sodium polyphosphate.

According to the process of this invention, the heat-resistant container charged with soybean and a coagulant are then subjected to retort treatment after sealing the container to simultaneously coagulate and sterilize the soybean milk by a high temperature and pressure treatment.

It is necessary in the invention to control the rate of rise in temperature at the center of the material being treated to within the range of 0.05° to 1.0° C./sec during the term from the beginning of the retort treatment to the inflection point A on the time-temperature curve showing the change with time in the temperature at the center of the tofu and to inject air in the retort apparatus from at latest the inflection point to make the inner pressure of the apparatus higher than that in the container. Owing to the synergistic effect of these procedures, it becomes possible to prepare tofu free from pores and the occurrence of syneresis and having an excellent texture by using the retort treatment which heretofore has not been believed capable of providing a high quality tofu.

In particular, it is effective to control the rate of rise in temperature of the product for the reason that it imparts smooth and compact texture to the final tofu and restricts the occurrence of syneresis during the retort treatment.

Furthermore, the control of the pressure of the atmosphere surrounding the material to be treated at latest from the inflection point A is significantly effective to particularly restrict the formation of pores and the occurrence of syneresis as already mentioned above.

The term "inflection point" as used herein is clearly seen on the term-temperature curve (see point A of FIG. 1) and appears regardless of the retort treatment conditions under which the coagulation of soybean milk is carried out.

The time-temperature curve shown in FIG. 1 corresponds to a retort treatment in which the final retort temperature is fixed at 121° C. and the rate of rise in retort temperature falls within the range of the present invention while the injection of air is not carried out. Furthermore, the initial temperature at the center of tofu is 27° C.

The control of the rate of rise in temperature at the center of the product to be treated may be accomplished according to the invention by adjusting the amount of steam fed, i.e., the pressure of the steam fed into the retort.

In the invention, the control of the rate of rise in temperature at the center of the tofu is not continued throughout the whole period of retort treatment but is carried out only during the first step which is believed to have a strong influence on the formation of tofu texture, that is during the term from the beginning of the retort treatment to the inflection point A.

If the rate of rise in temperature is less than the lower limit of said range, i.e., if it is less than 0.05° C./sec, the temperature of the material at which the inflection point appears becomes very low and it takes a long time for the retort treatment since the air injection should be commenced from at latest such lower temperature. This results in a low thermal efficiency. While if the rate of rise in temperature is higher than the upper limit, 1.0° C./sec, the final tofu is inferior in compactness and smoothness to that of the invention, it becomes crumbly and it becomes rough and unhomogeneous so as to have different taste and texture at different parts.

Usually, when initiating the retort treatment, steam is firstly injected into the retort apparatus with the exhaust valve open to eliminate residual air in the apparatus. However, in the invention, it is preferable to inject air right after the end of such exhaust step, in other words after the exhaust valve is closed (at this point the temperature in the apparatus is approximately 80° to 90° C.).

According to the process of the invention, the injection of air is carried out so that the pressure in the apparatus is higher than that of the container and taking the rupture of the container and the heat transfer efficiency into consideration, the air is preferably injected so that the pressure difference between the apparatus and the container is 0.05 to 1 Kg/cm$^2$. This means that the pressure in the apparatus is equal to the sum of the saturated vapour pressure and the pressure difference, 0.05 to 1 Kg/cm$^2$.

Air injection has in the past been applied in the retort treatment when a container of synthetic resin such as retort pouch is used. However, such application of the air injection is simply to prevent the container from rupture. Furthermore, the air injection has usually been carried out at the end of retort treatment since air injection reduces thermal efficiency. According to the invention the conditions of heating for the retort treatment other than the rate of rise in temperature are not critical and the desired tofu can be obtained regardless of these other conditions. However, it is suitable to use, for example the following treating time and the final retort preset temperature:

| Preset temperature (°C.) | Treating time (min) |
| --- | --- |
| 110 | 80 to 100 |
| 120 | 30 to 40 |
| 130 | 20 to 25 |

As the heating medium used in the retort treatment according to the present invention, there may be mentioned for example steam, hot water or the like.

The present invention will now be illustrated more concretely by referring to the following nonlimitative examples and comparative examples.

EXAMPLE 1

Soybeans in their entirety were immersed in water and then ground after the addition of water. The ground soybean was boiled for 3 to 4 minutes after the addition of silicone and glycerol fatty ester as an antifoaming agent and the lees were separated to form soybean milk having a solids concentration of 10% by weight of the soybean milk.

After cooling the soybean milk thus obtained, 0.2% G.D.L. (based on the weight of the soybean milk) was added mixed in as the coagulant. The mixture was introduced into a heat-resistant synthetic resin container and the container was sealed. At this stage, the temperature at the center of the mixture was 18° C. Then, the container was introduced into a retort apparatus in which the final retort temperature was preset at 121° C. and the retort treatment was initiated so that the rate of rise in temperature at the center of the mixture was 0.6° C./sec. After 1 minute, air was injected into the retort apparatus for retort so that the inner pressure of the apparatus became 1.3 Kg/cm$^2$, and 39 minutes after the initiation of the treatment the retort treatment was completed and the retort tofu of this invention was obtained (sample A).

The inflection point A appeared 2 minutes after the initiation of the retort treatment and the temperature corresponding to the inflection point A was 90° C.

EXAMPLE 2

Retort tofu according to the invention (sample B) was prepared in accordance with the same procedures as set forth in the example 1 except that the rate of rise in temperature was selected as 1.0° C./sec, the air injection was carried out 1.2 minutes after the initiation of the retort treatment and the treatment was completed after 36 minutes from the initiation of the treatment. The inflection point appeared after 1.3 minutes and the corresponding temperature was 93° C.

COMPARATIVE EXAMPLE 1

Retort tofu was obtained (sample C) according to the procedures as set forth in the example 1 except that the rate of rise in temperature was 1.2° C./sec, the injection of air was carried out after 1 minute and the retort treatment was finished in 35 minutes. The inflection point appeared 1.1 minutes after the initiation of the treatment and the corresponding temperature was 97° C.

COMPARATIVE EXAMPLE 2

Retort tofu (sample D) was prepared according to the same procedures as that described in the example 1 except that the rate of rise in temperature was set at 0.04° C./sec and air was injected 19 minutes after the starting of the treatment. The inflection point was observed 24 minutes after the beginning of the treatment and it corresponded to 76° C.

In the example, it took 40 minutes before the retort temperature reached the preset temperature of 121° C. (final retort temperature) and it took 75 minutes to finish the whole retort treatment.

COMPARATIVE EXAMPLE 3

Retort tofu (sample E) was obtained by the same procedures as described in the example 1 except that air was injected 3 minutes after the initiation of the retort treatment.

COMPARATIVE EXAMPLE 4

Retort tofu (sample F) was produced according to the procedures as set forth in the example 1 except that the rate of rise in temperature was set at 1.2° C./sec, air was injected 1.3 minutes after the initiation of the retort treatment and the treatment was finished in 35 minutes.

The inflection point was observed 1.1 minutes after the initiation of the treatment and the corresponding temperature at the center of the tofu was 97° C.

The samples thus obtained were examined on the formation of pores, the occurrence of syneresis and texture. The comparison of the texture between the samples was carried out by the sensory test. The results obtained are shown in Table 1.

TABLE 1

| Sample | Rate of Rise in Temp. (°C.) | Time of Appearance of Inflection Point (min) | Time of the Initiation of Air Injection (min) | Pores | Syneresis | Texture |
|---|---|---|---|---|---|---|
| A | 0.6 | 2 | 1 | absent | very little | excellent |
| B | 1.0 | 1.25 | 1.2 | absent | very little | good |
| C | 1.2 | 1.1 | 1 | very few | some | smooth and palatable dry and crumbly, low integrity, unhomogeneous taste |
| E | 0.6 | 2 | 3 | many | much | smooth but lacking in compactness |
| F | 1.2 | 1.1 | 1.3 | many | very much | coarse, dry and cryumbly, unhomogeneous taste |

As is clear from the foregoing results, the samples C, E and F which were not prepared according to the invention included many pores and exhibited syneresis and the texture thereof was not acceptable. Therefore, resulting tofu did not have commercially acceptable properties. Furthermore, significant time was needed to carry out the procedures of the comparative example 2 and such process was not suitable for industrial production of tofu.

On the other hand, the samples A and B according to the invention were free from pores and syneresis and the texture thereof was quite excellent. These samples therefore, exhibited quite excellent qualities compared to the samples C, E and F.

The samples according to the invention showed no change in their quality even after storage for six months.

EXAMPLE 3

Soybean milk (soybean solids content being 9.5%) was prepared according to the method described in the example 1. To the soybean milk was added 0.3% by weight of calcium sulfate (based on the soybean used) as the coagulant. After the coagulant had been in, the mixture was charged into a heat-resistant container and the container was sealed.

At this point, the temperature at the center of the mixture was 15° C.

Then the container was introduced into a retort apparatus. The final retort temperature was set at 121° C., and the retort treatment was commenced at the rate of rise in temperature of 0.7° C./sec. Air injection was commenced 70 seconds after the initiation of the treatment so that the pressure in the apparatus became 1.6 Kg/cm² and the retort treatment was finished in 38 minutes to form retort tofu of this invention.

The inflection point was observed 80 seconds after the beginning of the treatment and the corresponding temperature of the treated tofu was 71° C.

The resulting tofu was quite free from pores and syneresis and the texture thereof was smooth and compact.

While the invention has been particularly shown and described in reference to preferred embodiments thereof, it will be understood by those skilled in the art that changes in form and details may be made therein without departing from the spirit and scope of the invention.

We claim:

1. In a process for preparing retort tofu comprising the steps of charging a mixture of soybean milk or an aqueous solution of separated soybean protein and a coagulant into a heat-resistant container, sealing the container and then subjecting the container to heat treatment under pressure in a retort apparatus, the improvement which comprises:
   (a) adjusting the rate of rise in temperature at the center of the mixture to within the range of about 0.05° to about 1.0° C./sec. by controlling a flow rate of steam or hot water to the retort apparatus from the beginning of the treatment to the inflection point A of a time-temperature graph having time as the abscissa and temperature as the ordinate of the graph, and
   (b) controlling the pressure in the retort apparatus at the latest at the inflection point A by introducing air into the retort apparatus in order to make the pressure in the retort apparatus higher than that in the container.

2. A process for preparing retort tofu as set forth in claim 1 wherein the air introduction is carried out so that the pressure difference between the retort apparatus and the container is in the range of about 0.05 to about 1 kg/cm².

3. A process for preparing retort tofu as set forth in claim 1 wherein the solids concentration in the soybean milk or the aqueous solution of separated soybean protein is in the range of about 5 to about 18 percent based on the weight of the soybean milk.

4. A process for preparing retort tofu as set forth in claim 1 wherein the coagulant is a member selected from the group consisting of δ-gluconic lactones and calcium sulfate.

5. A process for preparing retort tofu as set forth in claim 4 wherein the coagulant is δ-gluconic lactones and the amount thereof is in the range of about 0.1 to about 0.4 percent based on the weight of the soybean milk used.

6. A process for preparing retort tofu as set forth in claim 4 wherein the coagulant is calcium sulfate and the amount thereof of in the range of about 0.15 to about 0.5 percent based on the weight of the soybean milk used.

7. A process for preparing retort tofu as set forth in claim 6 wherein a coagulation-retarding agent is used in the process and is selected from the group consisting of sodium pyrophosphate and sodium polyphosphate.

8. Retort tofu having excellent compactness, smoothness and good taste and free from pores and syneresis, which is prepared according to claim 1.

9. A process for preparing tofu as set forth in claim 1 wherein the coagulant is a mixture of δ-gluconic lactones and calcium sulfate.

* * * * *